(12) United States Patent
Frederickson et al.

(10) Patent No.: US 11,417,160 B2
(45) Date of Patent: Aug. 16, 2022

(54) SERVICE KIOSK ACCESS

(71) Applicant: Hewlett-Packard Development Company, L.P., Spring, TX (US)

(72) Inventors: Matthew Frederickson, Boise, ID (US); Gerold Keith Shelton, Boise, ID (US); Kyle J. Nottingham, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,350

(22) PCT Filed: Apr. 30, 2018

(86) PCT No.: PCT/US2018/030290
§ 371 (c)(1),
(2) Date: Jul. 26, 2019

(87) PCT Pub. No.: WO2019/212514
PCT Pub. Date: Nov. 7, 2019

(65) Prior Publication Data
US 2021/0335070 A1    Oct. 28, 2021

(51) Int. Cl.
*G07C 9/00* (2020.01)
(52) U.S. Cl.
CPC ............... *G07C 9/00912* (2013.01)
(58) Field of Classification Search
CPC .................................... G07C 9/00912
See application file for complete search history.

(56) References Cited

U.S. PATENT DOCUMENTS

| | | | |
|---|---|---|---|
| 6,513,119 | B1 | 1/2003 | Wenzel |
| 8,235,247 | B2 | 8/2012 | Alvarez |
| 9,452,884 | B2 | 9/2016 | Rutledge et al. |
| 9,680,660 | B2 | 6/2017 | Forsyth |
| 2001/0037207 | A1 | 11/2001 | Dejaeger |
| 2005/0267778 | A1 | 12/2005 | Kazman |

(Continued)

FOREIGN PATENT DOCUMENTS

| | | |
|---|---|---|
| JP | 2010-165098 A | 7/2010 |
| JP | 2012-059044 A | 3/2012 |

(Continued)

*Primary Examiner* — Nabil H Syed
(74) *Attorney, Agent, or Firm* — HP Inc. Patent Department

(57) ABSTRACT

Examples associated with service kiosk access are described. One example includes monitoring the contents of a set of compartments of a service kiosk. Each compartment is capable of storing at least one electronic device in a manner that provides a power to the electronic device and a data connection to the electronic device. Upon reaching a specified condition, a request is generated for a technician to provide physical service for the service kiosk. The specified condition may be related to a status of the service kiosk, contents of the compartments of the service kiosk, and/or statuses of the contents of the compartments of the service kiosk. The technician is authenticated as being physically present at the service kiosk, and physical access to compartments associated with the specified condition is granted to the technician.

15 Claims, 4 Drawing Sheets

(56) References Cited

U.S. PATENT DOCUMENTS

| | | |
|---|---|---|
| 2008/0088454 A1* | 4/2008 | Flores .................. G06Q 10/087 |
| | | 340/572.4 |
| 2010/0088192 A1 | 4/2010 | Bowles et al. |
| 2011/0060945 A1 | 3/2011 | Leprince et al. |
| 2011/0161227 A1 | 6/2011 | Santo, Jr. |
| 2012/0079100 A1 | 3/2012 | McIntyre et al. |
| 2012/0254345 A1 | 10/2012 | Montoya |
| 2012/0265969 A1 | 10/2012 | Alexander et al. |
| 2013/0335027 A1 | 12/2013 | Xin |
| 2014/0052463 A1 | 2/2014 | Cashman et al. |
| 2015/0052452 A1 | 2/2015 | Alekhin |
| 2015/0254603 A1* | 9/2015 | Bashkin ................. A47B 57/06 |
| | | 312/237 |
| 2015/0269535 A1 | 9/2015 | Parris |
| 2016/0283702 A1 | 9/2016 | Rarely et al. |
| 2016/0335616 A1 | 11/2016 | Bordeleau et al. |
| 2017/0111521 A1* | 4/2017 | Bowers ................. H04W 12/08 |
| 2019/0101463 A1* | 4/2019 | Fly ......................... G06Q 50/04 |
| 2019/0172291 A1* | 6/2019 | Naseath ............. G07C 9/00912 |

FOREIGN PATENT DOCUMENTS

| | | |
|---|---|---|
| JP | 2014-527390 A | 10/2016 |
| KR | 2012-0033730 A | 4/2012 |
| WO | WO-1998040826 | 9/1998 |
| WO | WO-2017044764 | 3/2017 |
| WO | WO-2017044764 A1 | 3/2017 |

* cited by examiner

SERVICE KIOSK ACCESS

BACKGROUND

Computing devices today have become a fundamental part of the way we live and work, as well as smaller and more mobile. Individuals, for example, use computers and mobile devices for entertainment, communication, shopping, and so forth. Further, businesses often provide computers for their employees so that the employees can efficiently carry out their duties across a wide variety of functions. While some businesses take on ownership and maintenance of devices provided to their users, other companies may opt to offload certain information technology costs using a variety of techniques. For example, some companies may rely on a device-as-a-service (DAAS) offering. A DAAS offering may involve periodic payments to a device provider in exchange for user devices and service guarantees for the hardware, software, and so forth, of the devices.

BRIEF DESCRIPTION OF THE DRAWINGS

The present application may be more fully appreciated in connection with the following detailed description taken in conjunction with the accompanying drawings.

DETAILED DESCRIPTION

Figure 1:
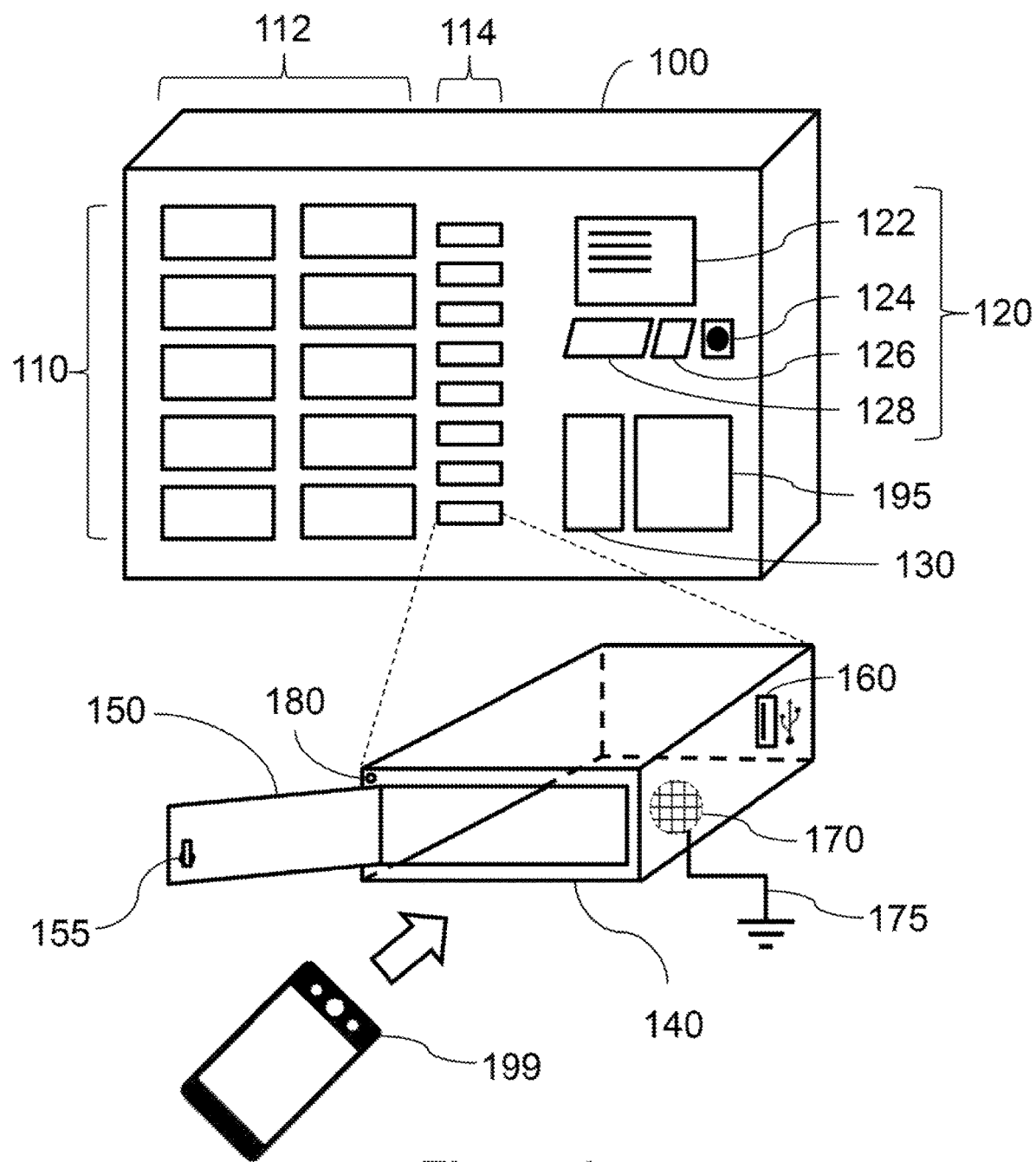
FIG. 1 illustrates an example service kiosk associated with service kiosk access.

Examples associated with service kiosk access are described. As will be more fully described herein, a service kiosk is an apparatus that is meant to store a set of devices for supporting a device-as-a-service model. The service kiosk includes a set of compartments each fitted with connectors to provide a connection between a device stored within the compartment and various control modules embedded in the service kiosk. The service kiosk may be physically installed in a location accessible to employees of a company relying on a device-as-a-service model to provide electronic devices to its employees. When service events associated with devices occur, the employees may visit the kiosk to have their device repaired by the kiosk and/or replaced by backup devices stored in the kiosk. This may increase the uptime of devices assigned to the employees. The backup devices may also reduce support costs associated with sending out technicians to provide support as a device failure can be at least temporarily mitigated by replacing the failed device with a new device in the kiosk, until eventually, a technician can be sent out to efficiently service or replace many devices stored in the kiosk in a single visit.

This description covers the process by which the contents of a kiosk may be monitored for the purposes of determining when to send out a technician to perform in-person service on the kiosk itself, devices stored in the kiosk, and/or to adjust the number or types of devices in the kiosk. Over time, depending on a variety of factors related to a business in which the service kiosk is embedded, the kiosk may become empty as new employees join the business, full as employees leave the business, and so forth. Similarly, devices may benefit from in person service or replacement as a result of devices in the service kiosk being used to replace devices in use by the business that have encountered a hardware or other failure. Consequently, when a condition is met that indicates desirability of an in person visit by a technician to service the kiosk, a message may be transmitted (e.g., from the kiosk) to schedule such a visit. When the technician arrives, the technician may be authenticated by the service kiosk, and then granted physical access to compartments of the service kiosk storing devices to be removed and/or repaired, as well as compartments of the service kiosk that should have a new device added in the case that the service kiosk was low on devices. The service kiosk may guide the technician through the process through an interface on the kiosk, such as a display that describes what action to take with respect to individual compartments and the device(s) therein, as well as, for example, indicators on individual compartments themselves.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

As used herein a service kiosk is intended to broadly describe a category of apparatuses used to securely store electronic devices in a manner that allows the devices to be configured while stored in the service kiosk. The service kiosk may have one or more compartments having data and/or power connectors. Devices that are attached to the data connectors may be configured either directly by the service kiosk or remotely by a remote service. Depending on where the devices are in their life cycle, the configuration may include setting up a device for a new user, modifying the device on behalf of a current user (e.g., reconfiguring the device, repairing the device), deprovisioning a device, and so forth. The service kiosk may also include an interface for communicating with and/or authenticating users. Once authenticated, the service kiosk may grant the user access to devices and or compartments to allow the user to perform a task related to a device assigned to the user. The task may involve obtaining a device from the kiosk, storing a device in the kiosk, and so forth. In various examples, the service kiosk may resemble, for example, a vending machine, a set of lockers, a chest of drawers, and so forth. Various structural components of a service kiosk may be made from wood, metal, plastic, or other suitable materials. The service kiosk may include structural elements such as legs, supports, wall fasteners, and so forth.

Consequently, the service kiosk may facilitate fulfilling service guarantees of a device-as-a-service (DAAS) offering. In a DAAS offering, a user or business may periodically pay a device provider for a device and a promise to service the device in the event the device fails. The service guarantee may include a variety of terms and in various examples may cover firmware, software, hardware, device data, user data, periodic lifecycle upgrades, and so forth. In this example, ownership of the device may remain with the device provider. In the event of a failure of the device or some other technical issue related to the device, a service kiosk stationed in a location accessible to the user may allow the device provider to more easily provide technical support for the device, up to and including replacing the device with a working device. For businesses that are relying on several devices at any given time, it may be cost effective for the business to have an on-site service kiosk to be able to quickly provision a new device for a new user, deprovision a device when that device's user leaves the business, and so forth, in addition to the technical support features that may be facilitated by the service kiosk itself. Eventually, when it is determined that the state of the devices in the service kiosk make it likely the service kiosk will begin failing to fulfil the service guarantee to the business (e.g., because the service kiosk is full, empty, has a number of devices in need of repair, or a combination of factors) a technician may be called to service the kiosk and/or devices stored within. This may be less expensive to the business and/or the device provider than having a technician on site, or having a technician called to service each malfunctioning device.

FIG. 1 illustrates an example service kiosk 100 associated with receptacle isolation. Service kiosk 100 includes a set of receptacles 110. While 18 receptacles are shown, in other examples, service kiosk 100 may include a greater or lesser number of receptacles. The receptacles 110 may be adapted for storing electronic devices 199. Different receptacles may be adapted to store different types of electronic devices 199. Here for example, receptacles 112 may be adapted to store a first type of device (e.g., laptops), and receptacles 114 may be adapted to store a second type of device (e.g., cell phones). In other examples, receptacles may be configured to store different types, models, and/or brands of laptops, phones, tablets, or other device types. Receptacles 110 may be adapted to store different types of devices based on a variety of attributes. For example, receptacles 110 for storing phones may be smaller than receptacles 110 for storing laptops.

One receptacle 140 is illustrated in additional detail to further illustrate features of receptacles 110. In this example, receptacle 140 is adapted for storing cellular phones 199. This may affect the size of receptacle 140, connectors 160 installed in receptacle 140, and so forth. Here, receptacle 140 is shown as having a universal serial bus (USB) connector 160. USB connector 160 may provide power to device 199 as well a data connection between device 199 and other components of service kiosk 100. For laptops, receptacles 110 may use a different configuration of connectors 160 for providing power and/or data to a device 199. For example, a regional power adaptor may be used for providing power to devices. The data connection for a laptop may be provided using, for example, an ethernet port, a universal serial bus port, or other types of ports.

It is also worth observing that in other examples, connector 160 may take different physical forms. Here, connector 160 is illustrated as a USB port in the rear wall of receptacle 140. This may mean that to connect device 199 to connector 160, an appropriate cable would also need to be provided. In other examples, connectors 160 may be cables or retractable cables of the appropriate type for connecting to a device type for which receptacle 140 is configured, a docking port of the appropriate type for connecting to a device type for which receptacle 140 is configured, a wireless communication transmitter (e.g., WIFI, Bluetooth) and so forth. The different connector types may have different tradeoffs. For example, a USB port as illustrated may ensure that a device appropriate cable is provided to a user who obtains a device from receptacle 140, but would also mean that a user inserting a device 199 would have to bring or be provided such a cable. Alternatively, a connector that involves an installed cable or docking port may ensure that a person inserting a device into receptacle 140 would be able to insert the device without providing an additional cable, but would mean that a user retrieving a device from receptacle 140 would have to be provided an appropriate cable through an alternative method.

Receptacle 140 also includes a locking mechanism 155. In this example, locking mechanism 155 is illustrated as being attached to a door 150 of receptacle 140. However, locking mechanism 155 may take a variety of forms and its form may depend on the form by which door 150 is designed to give access to users. Here for example, door 150 is illustrated as opening outwards, though in other examples, a sliding, rotating, or retracting door may be appropriate. Locking mechanism 155 may be controllable by other components of service kiosk 100 to grant and restrict access to receptacle 140. These other components and the situations in which access to receptacle 140 may be controlled are more fully discussed below. In some examples, it may also be desirable for locking mechanism 155 to be controllable via a physical mechanism (e.g., a service key). This may allow receptacle 140 to be serviced by a technician to, for example, modify the contents of receptacle 140, repair a component of receptacle 140, and so forth, even when service kiosk 100 is unpowered.

In this example, receptacle 140 is illustrated as incorporating a digital isolator 170. Here, digital isolator 170 is illustrated as a faraday cage 170 that is built into the structure of receptacle 140. Faraday cage 170 may prevent wireless electronic signals from being transmitted by device 199 to devices external to receptacle 140, as well as preventing device 199 from receiving wireless signals from devices external to receptacle 140. In this example, faraday cage 140 is illustrated as being grounded 175, though in other examples, the ground may be excluded. Other digital isolation techniques may also be employed. For example, digital isolation may also be achieved via the port 160 providing a data connection between device 199 and other components of service kiosk 100. By way of illustration service kiosk 100 may implement individualized networks to prevent direct transmission of wired signals between devices in members of the set of receptacles 110. This may also prevent devices 199 from detecting whether other devices are connected to service kiosk 100. Digital isolation may also include signal isolation to ensure secure communication between devices in the receptacles 110 and other components of service kiosk 100. In some examples, digital isolation may also incorporate power isolation.

Service kiosk 100 also includes an interface 120. Interface 120 may include several components. Here interface 120 includes a display 122, a keyboard 128, a keypad 126, and a radio frequency identification (RFID) scanner 124. Interface 120 may use these components to facilitate communicating with user interacting with service kiosk 100. Interface 120 may also include additional components including for example, cameras, touch input devices, external device connectors (e.g., to provide power and/or data to devices not in receptacles 110), and so forth. Interface 120 may also make use of lights 180 associated with individual receptacles 110. These lights 180 may allow the interface to direct a user to a specific receptacle 110 of service kiosk 100. For example, when service kiosk 100 seeks to direct a user to a specific receptacle 110, service kiosk 100 may control a light on that receptacle to turn on, blink, and so forth.

Service kiosk 100 may also include a variety of modules 130 for performing various functions associated with service kiosk 100 and/or configuring devices 199 stored in compartments 110 of service kiosk 100. Modules 130 may be, for example, performed by a processor of a computer embedded in service kiosk 130. In other examples, modules 130 may act as a communication pass through for communications between a remote information technology module (e.g., a device-as-a-service operation) and devices 199 stored in compartments 110 of service kiosk 100.

In various examples, the modules 130 may interact with a user via interface 120, with devices 199 in compartments 110, with other modules 130, and with remote servers and/or devices. For example, modules 130 may include an authentication module. The authentication module may receive a credential from a user and authenticate the credential based on authentication data associated with the user. The authentication data may have been received from a remote information technology module. When the user is successfully authenticated, the authentication module or another module 130 of service kiosk 100 may grant the user access to one or more receptacles 110 of service kiosk 100. The user may provide the credential via user interface 120. The credential may be, for example, a username and password pair that identifies the user that the user inputs via keyboard 128. In another example, the credential may be an RFID signal the user provides via RFID scanner 124. In another example, the user may authenticate themselves by attaching the mobile device 199 to a data connector of service kiosk 100. Multifactor authentication may also be appropriate involving a combination of the above and/or other authentication techniques.

In various examples, service kiosk 100 may be selective about granting user access to receptacles 110. How service kiosk 100 determines which receptacles 110 to which a user is granted access may depend on what function service kiosk 100 is performing for the user. In various examples, the user may be picking up a device from service kiosk 100, storing a device in service kiosk 100, having a device repaired or configured by service kiosk 100, diagnosing a technical issue with a device with the help of service kiosk 100, and so forth. In these examples, service kiosk 100 may grant such a user access only to receptacles associated with the task being performed by service kiosk 100. The user may be granted access to these receptacles 110 by service kiosk 100 controlling locking mechanisms 155 on the respective receptacles 110. In cases where the user is a technician responsible for servicing service kiosk 100, the user may be granted access to specific receptacles, or in some cases general access to all receptacles 110. This may allow the technician to adjust the contents of the receptacles and/or perform physical maintenance on devices stored within service kiosk 100 or on service kiosk 100 itself.

Service kiosk 100 may also include a variety of other components 195. For example, component 195 may be a compartment storing additional supplies that support the purpose of service kiosk 100. By way of illustration, component 195 may store spare parts, extra data and/or power cables, and so forth that may be used by users interacting with service kiosk 100. In other examples, component 195 may also store, for example, packaging and mailing supplies for shipping devices 199 for service. Other potential components 195 may also be contemplated.

Figure 2:
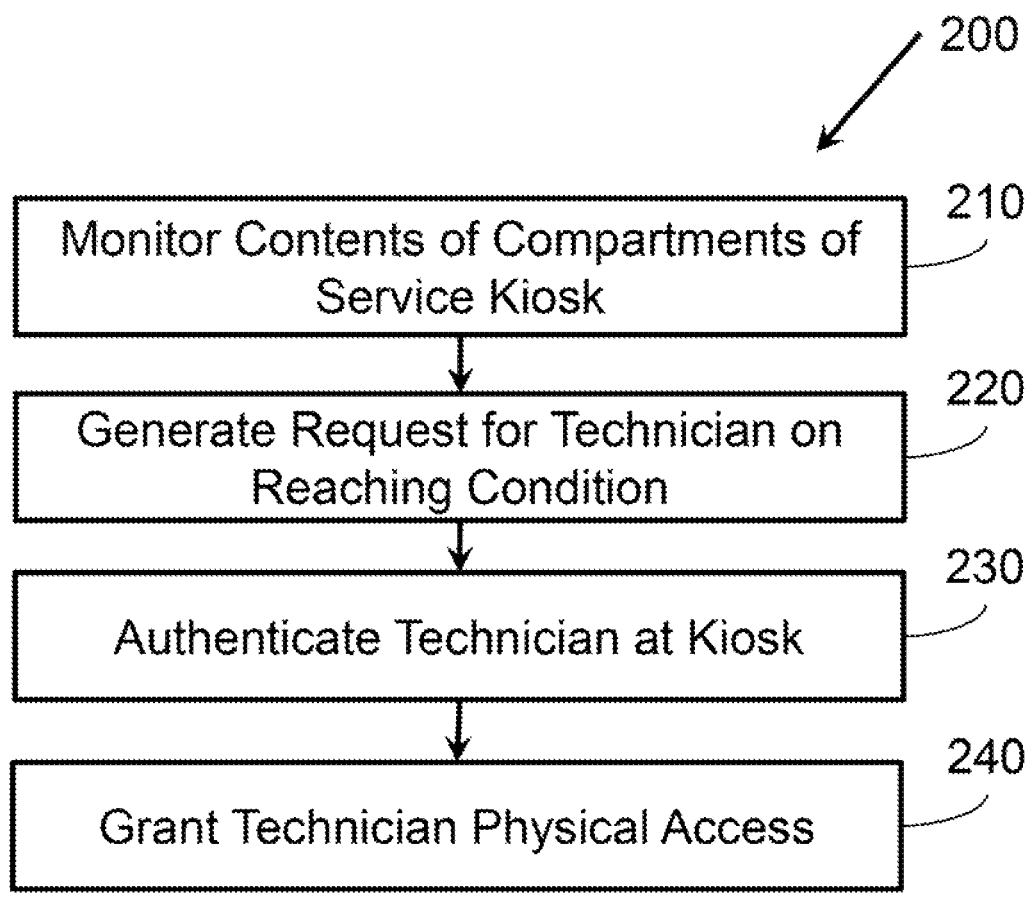
FIG. 2 illustrates a flowchart of example operations associated with service kiosk access.

FIG. 2 illustrates an example method 200. Method 200 may be embodied on a non-transitory processor-readable medium storing processor-executable instructions. The instructions, when executed by a processor, may cause the processor to perform method 200. In other examples, method 200 may exist within logic gates and/or RAM of an application specific integrated circuit (ASIC).

Method 200 may perform various tasks associated with service kiosk access. Method 200 includes monitoring the contents of a set of compartments of a service kiosk at 210. The compartments may each be capable of storing at least one electronic device in a manner that provides power to the electronic device and a data connection to the electronic device.

Method 200 also includes generating a request for a technician at 220. Generating the request for the technician may occur upon reaching a specified condition. The specified condition may relate to, for example, contents of compartments of the service kiosk, a status of the service kiosk, a status of a content of a compartment of the service kiosk, and so forth. In some examples, the request may identify components and/or devices that will facilitate resolving the specified condition.

Method 200 also includes authenticating the technician is physically present at the service kiosk at 230. The technician may be authenticated via an interface of the service kiosk. The interface may include a display, input devices (e.g., keyboard, mouse, keypad), radio frequency identification readers, and so forth. The technician may be authenticated based on a credential provided by the technician. The credential may include, for example, a password, a radio frequency identifier, a biometric, and so forth. Authenticating the user may include transmitting the credential to a remote device and receiving a signal from the remote device signaling that the credential belongs to the technician.

Method 200 also includes granting the technician physical access to compartments of the service kiosk at 240. The compartments the technician is granted access to may be compartments associated with the specified condition. For example, the specified condition may relate to the compartments of the service kiosk reaching a predefined capacity threshold. In this example, the technician may be granted physical access to compartments to adjust the number of devices stored in the compartments (e.g., removing devices from the compartments, adding devices to the compartments). In another example, the specified condition may relate to a quantity of devices in the compartments that have reached a certain life cycle status. Here the technician may be granted physical access to compartments to replace out of life cycle devices.

In another example, the specified condition may relate to a quantity of devices that have a malfunction flagged for physical repair. In this example, the technician may be granted physical access to compartments to perform the physical repairs on the devices. The physical repairs may involve for example, replacing components of devices, replacing devices, and so forth. In another example, the specified condition may relate to a quantity of devices that have been requested at a site at which the kiosk is located.

The devices may have been requested by an administrator in association with an upcoming service event. Here, the technician may be granted access to compartments in support of fulfilling the upcoming service event.

In another example, the specified condition may relate to a physical property of a component of the service kiosk itself. Here the technician may be granted access to the component of the service kiosk to, for example, repair the component of the service kiosk. In another example, the specified condition may relate to a combination of factors. These combined factors may indicate that current statuses of devices in the service kiosk indicates that a likelihood of being able to fulfil a quality of service guarantee has achieved a specified threshold level.

In some examples, method 200 may also include providing the technician instructions on a compartment by compartment basis for resolving the specified condition (not shown). The instructions may be provided via an interface on the service kiosk. By way of illustration, a display on the service kiosk may identify compartments by location and/or number, as well as an action to take with respect to the compartments. Alternatively, lights or other indicators built into individual compartment may be lit, flashed, or otherwise activated to indicate compartments that the technician should access to resolve the specified condition.

Figure 3:
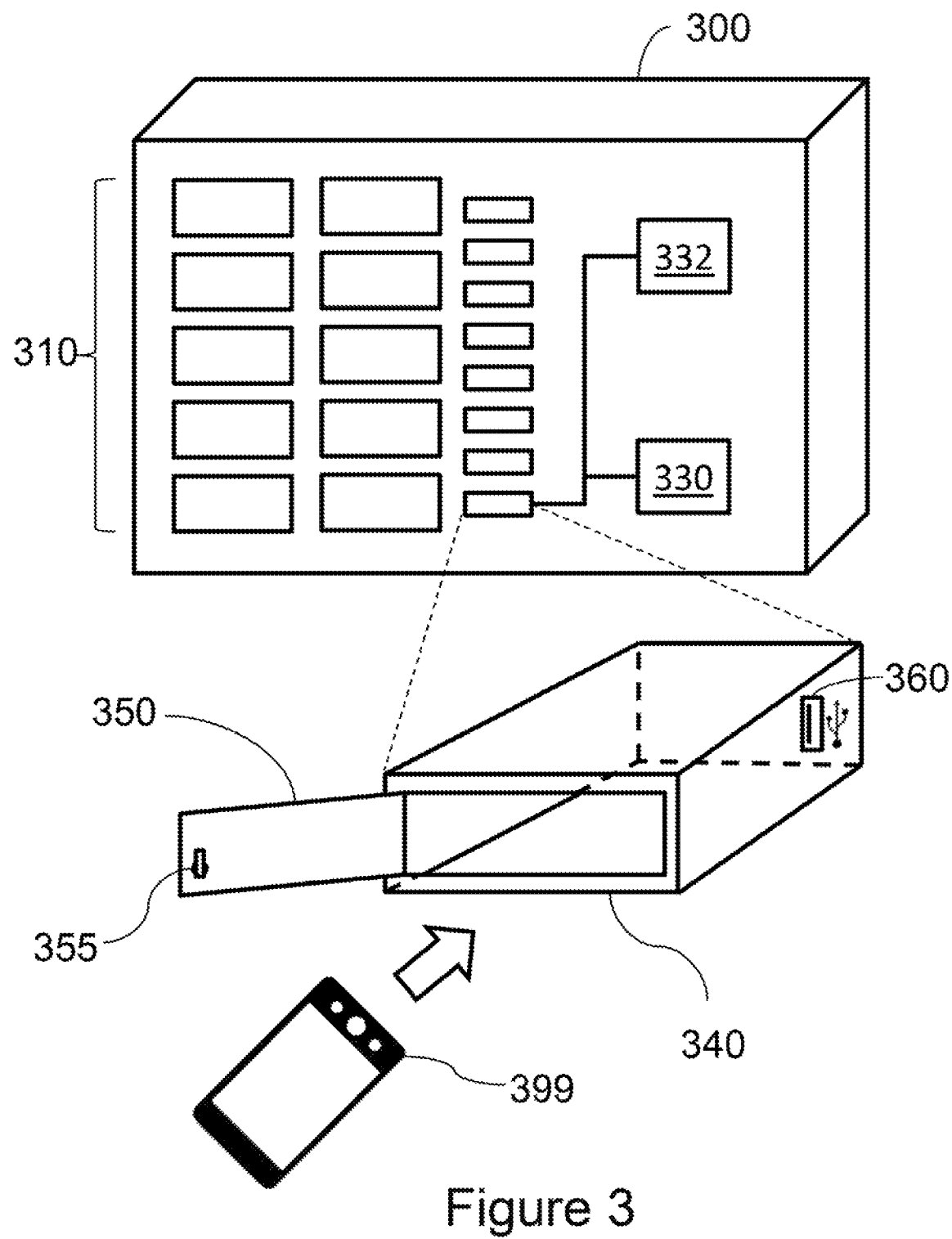
FIG. 3 illustrates another service kiosk associated with service kiosk access.
Figure 4:
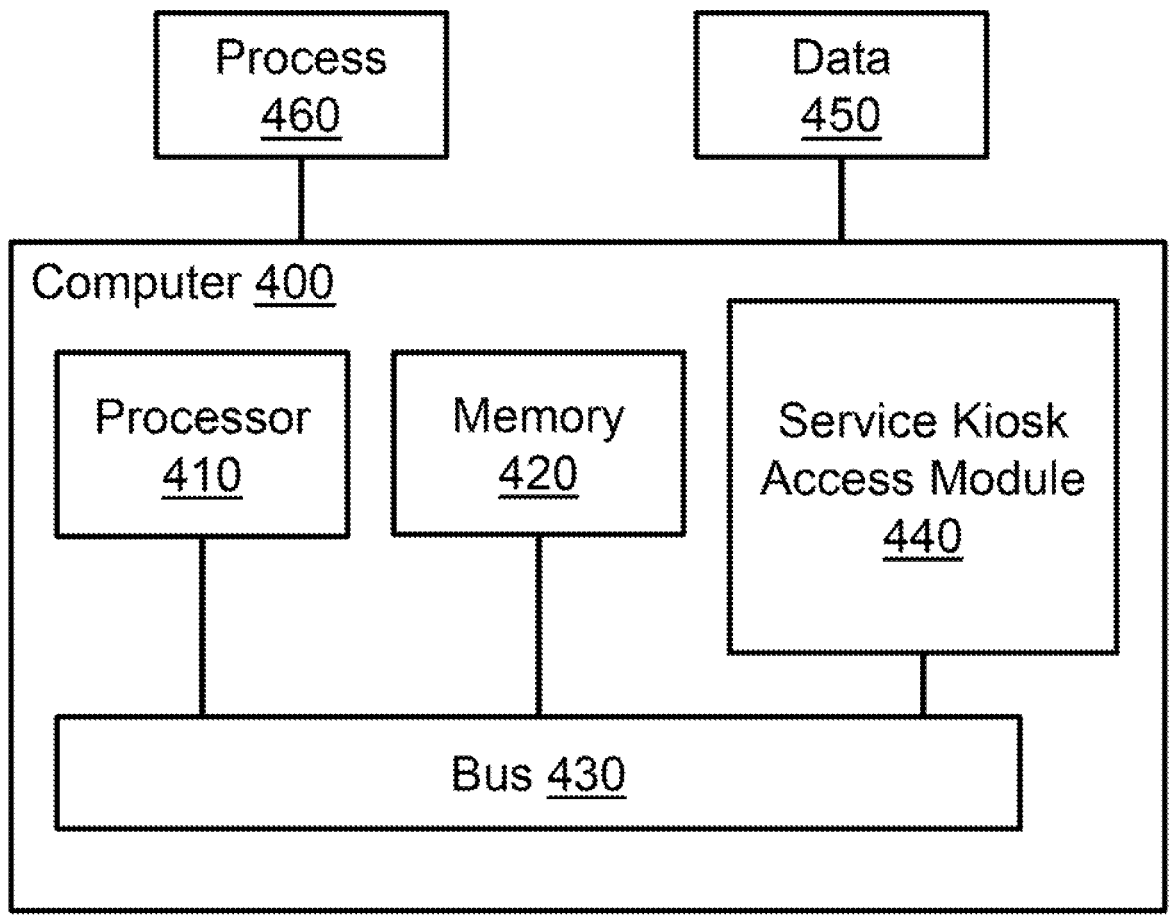
FIG. 4 illustrates an example computing device in which example systems, and methods, and equivalents, may operate.

FIG. 3 illustrates an example service kiosk 300 associated with service kiosk provisioning. Service kiosk 300 includes a set of receptacles 310. An example receptacle 340 is illustrated in additional detail. Each member of the set of receptacles 310 includes an adaptor 360. Adaptor 360 may provide power to an electronic device 399, a data connection between electronic device 399 and components of service kiosk 300, and so forth. Members of the set of receptacles 310 may also include a locking mechanism 355 to secure the contents of the receptacles 310 (e.g., electronic device 399). In this example, locking mechanism 355 is attached to a door 350 of example receptacle 340. Here the locking mechanism may be able to rotate in a manner that prevents door 355 from opening.

Service kiosk 300 also includes a monitor module 330. Monitor module 330 may monitor statuses of the contents of the receptacles 310. Monitor module 330 may monitor the contents via the data connections in the receptacles 310. When a specified condition is reached, monitor module may transmit a signal requesting a technician provide physical service for service kiosk 300. The specified condition may relate to, for example, a status of service kiosk 300, contents of compartments 310 of service kiosk 300, and statuses of contents of compartments 310 of service kiosk 300. In some examples, the signal requesting the technician may specify components, devices, and so forth, that the technician should bring to resolve the specified condition.

Service kiosk 300 also includes an authentication module 332. Authentication module 332 may authenticate the physical presence of the technician based on a credential provided by the technician. When the technician is authenticated, authentication module 332 may provide the technician physical access to receptacles 310 associated with the specified condition. Physical access may be granted using locking mechanisms corresponding to the receptacles associated with the specified condition.

In some examples, service kiosk 300 may include a user interface (not shown). The user interface may provide the technician instructions for resolving the specified condition on a receptacle by receptacle basis.

FIG. 5 illustrates an example computing device in which example systems and methods, and equivalents, may operate. The example computing device may be a computer 500 that includes a processor 510 and a memory 520 connected by a bus 530. Computer 500 includes a service kiosk access module 540. Service kiosk access module 540 may perform, alone or in combination, various functions described above with reference to the example systems, methods, and so forth. In different examples, service kiosk access module 540 may be implemented as a non-transitory computer-readable medium storing processor-executable instructions, in hardware, software, firmware, an application specific integrated circuit, and/or combinations thereof.

The instructions may also be presented to computer 500 as data 550 and/or process 560 that are temporarily stored in memory 520 and then executed by processor 510. The processor 510 may be a variety of processors including dual microprocessor and other multi-processor architectures. Memory 520 may include non-volatile memory (e.g., read-only memory, flash memory, memristor) and/or volatile memory (e.g., random access memory). Memory 520 may also be, for example, a magnetic disk drive, a solid state disk drive, a floppy disk drive, a tape drive, a flash memory card, an optical disk, and so on. Thus, memory 520 may store process 560 and/or data 550. Computer 500 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method, comprising:
monitoring contents of a set of compartments of a service kiosk, where each compartment is adapted to store an electronic device in a manner that provides power and a data connection to the electronic device while restricting communications involving the electronic device to the data connection;
upon reaching a specified condition associated with at least one of, a status of the service kiosk, the contents of the compartments of the service kiosk, and a status of a content of the compartments of the service kiosk, generating a request for a technician to provide physical service for the service kiosk;
authenticating that the technician is physically present at the service kiosk; and
granting the technician physical access to compartments associated with the specified condition.

2. The method of claim 1, where the specified condition relates to the compartments of the service kiosk reaching a predefined capacity threshold, and where the technician is granted physical access to compartments to adjust the number of devices stored in the compartments.

3. The method of claim 1, where the specified condition relates to a quantity of devices in the compartments that have reached a certain life cycle status, and where the technician is granted physical access to compartments to replace out of life cycle devices.

4. The method of claim 1, where the specified condition relates to a quantity of devices that have a malfunction flagged for a physical repair, and where the technician is granted physical access to compartments to perform the physical repairs on the devices.

5. The method of claim 1, where the specified condition relates to a quantity of devices that have been requested at a site at which the kiosk is located by an administrator in association with an upcoming service event, and where the technician is granted access to compartments in support of fulfilling the upcoming service event.

6. The method of claim 1, where the specified condition relates to a physical property of a component of the service kiosk and where the technician is granted access to the component of the service kiosk to repair the component of the service kiosk.

7. The method of claim 1, where the specified condition relates to a combination of factors that indicate the current statuses of devices in the service kiosk indicates that a likelihood of being able to fulfil a quality of service guarantee has achieved a specified threshold level.

8. The method of claim 1, comprising providing to the technician, via an interface on the service kiosk, instructions on a compartment by compartment basis for resolving the specified condition.

9. The method of claim 1, where the request for the technician to provide physical service for the kiosk identifies components and devices that will facilitate resolving the specified condition.

10. A service kiosk, comprising:
a set of receptacles adapted to store electronic devices, each receptacle comprising:
an adaptor for providing power and a data connection to an electronic device, wherein the receptacle is adapted to restrict communications involving the electronic device to the data connection; and
a locking mechanism to secure contents of the receptacle;
a processor; and
memory coupled to the processor, the memory storing instructions that upon execution by the processor cause the processor to:
monitor statuses of the contents of the receptacles via the data connections and to transmit a signal requesting a technician provide physical service for the service kiosk when a specified condition is reached regarding at least one of a status of the service kiosk, the contents of the receptacles, and statuses of the contents of the receptacles; and
authenticate the physical presence of the technician based on a credential provided by the technician, and to provide physical access to the technician to receptacles associated with the specified condition using locking mechanisms corresponding to the receptacles associated with the specified condition.

11. The service kiosk of claim 10, comprising a user interface to provide the technician instructions for resolving the specified condition on a receptacle by receptacle basis.

12. The service kiosk of claim 10, where the signal requesting the technician provide physical service to the device specifies at least one of a set of components and a set of devices the technician should bring to resolve the specified condition.

13. A non-transitory computer-readable medium storing processor executable instructions that, when executed, control a processor to:
monitor contents of a set of compartments of a service kiosk, where members of the set of compartments include a power adaptor for providing power to an electronic device, a network adaptor for providing a data connection to the electronic device, a locking mechanism for securing the contents of the compartments, and an isolation mechanism for restricting communications involving the electronic device to the data connection;
detect a specified condition associated with at least one of, a status of the service kiosk, the contents of the compartments of the service kiosk, and statuses of the contents of the compartments of the service kiosk;
generate a request for a technician to provide physical service for the kiosk;
receive authentication information associated with a dispatched technician;
receive a credential from dispatched technician at a user interface of the service kiosk that matches the authentication information; and
control locking mechanisms of members of the set of compartments associated with the specified condition to provide the dispatched technician access to the members of the set of compartments associated with the specified condition.

14. The non-transitory computer-readable medium of claim 13, where the instructions further control the processor to provide the dispatched technician, via a user interface of the service kiosk, information regarding the contents of the compartments of the service kiosk to allow the technician to resolve the specified condition.

15. The non-transitory computer-readable medium of claim 13, where the specified condition relates to one of, a capacity of the service kiosk, a life cycle status of a device in a compartment of the service kiosk, a maintenance event associated with a device in a compartment of the service kiosk, a status of a component of the service kiosk, and an upcoming event at a location in which the service kiosk is situated.

* * * * *